United States Patent [19]

Nelson

[11] Patent Number: 4,917,007

[45] Date of Patent: Apr. 17, 1990

[54] JUICING APPARATUS

[75] Inventor: Stewart C. Nelson, Forest Hills, N.Y.

[73] Assignee: The Automatic Orange Juicer Corporation, Forest Hills, N.Y.

[21] Appl. No.: 403,603

[22] Filed: Sep. 6, 1989

[51] Int. Cl.$^4$ ............................. B23N 1/02; B30B 9/02
[52] U.S. Cl. ........................................ 99/509; 99/495; 99/545; 100/98 R; 100/108; 100/213
[58] Field of Search ................. 99/495, 496, 509, 510, 99/513, 549, 565, 543, 545; 100/98 R, 213, 108, 107, 37, 39

[56] References Cited

U.S. PATENT DOCUMENTS

| | | | |
|---|---|---|---|
| 2,311,565 | 2/1943 | Nelson | 99/507 |
| 2,345,731 | 4/1944 | Coyle | 100/213 |
| 2,404,382 | 7/1946 | Klein | 100/98 R |
| 2,511,984 | 6/1950 | Johnson | 100/213 |
| 2,629,317 | 2/1953 | Nelson | 99/507 |
| 2,713,819 | 7/1955 | Lingle | 100/98 R |
| 3,736,865 | 6/1973 | Hait | 100/213 |
| 4,300,449 | 11/1981 | Segredo | 100/98 R |
| 4,352,325 | 10/1982 | Pleus | 99/545 |
| 4,376,409 | 3/1983 | Belk | 99/509 |
| 4,700,620 | 10/1987 | Cross | 99/509 |

Primary Examiner—Timothy F. Simone
Attorney, Agent, or Firm—Anthony J. Casella; Gerald E. Hespos

[57] ABSTRACT

A juicing apparatus includes a conveyor for delivering citrus fruit to the top of a truncated cone. The top of the cone defines a circular knife with a tube extending concentrically from the circular knife and through the convex cone. The fruit is centered on the convex cone by deflectable centering supports. A plurality of radially aligned knives are directed toward the upper portion of the convex cone. A concave cone is movably disposed over the fruit and over the convex cone. Downward movement of the concave cone causes a central cylindrical plug to be cut from each fruit and gently juiced in the tube extending from the circular knife. Further downward movement of the concave cone urges the fruit into the radially aligned knives and cuts the fruit into sections that can be squeezed and wiped against the outer surface of the convex cone. Ejectors are mechanically connected to the movable components of the apparatus and are operative to rapidly urge the remains of the fruit outwardly and toward discard chutes.

17 Claims, 6 Drawing Sheets

JUICING APPARATUS

BACKGROUND OF THE INVENTION

The subject invention relates generally to automatic juicing machines intended primarily for citrus fruits, such as oranges, grapefruit, lemons or limes. The typical prior art automatic juicing machine comprises means for cutting the fruit in half, means for squeezing the juice from the pulp in each half, means for recovering the squeezed juice and means for discarding the remains of the fruit. The prior art automatic juicers have taken many forms for achieving the above described basic operational steps. Examples of well known and effective juicers are shown in U.S. Pat. No. 2,311,565 which issued on Feb. 16, 1943 to T. G. Nelson and U.S. Pat. No. 2,629,317 which issued on Feb. 24, 1953 to T. G. Nelson. These prior art references show juicers that are adapted to deliver individual citrus fruits sequentially to a blade over which each fruit is urged to slice each truit in half. The hemispherical halves of each piece of fruit are then delivered by the juicing apparatus to an elastomeric support, such that the planar cut surface of each hemispherical piece of fruit is disposed face down on the elastomeric support. The apparatus disclosed in these two prior art references further comprises cones disposed below the elastomeric support and generally in register with the hemispherical pieces of fruit. The prior art apparatus disclosed in each of these patents is then operative to urge the hemispherical pieces of fruit and the elastomeric support downwardly and over the cones to express the juice from each piece of fruit. The expressed juice passes through apertures in the elastomeric support and is recovered in a tray disposed below the cones.

Several improvements to the juicing apparatus disclosed in the above referenced patents have been made by Stewart C. Nelson, the inventor herein. In particular, U.S. Pat. No. 4,479,425 issued to Stewart C. Nelson on Oct. 30, 1984 and is assigned to the assignee of the subject invention. U.S. Pat. No. 4,479,425 relates to improvements in the blade for bisecting the fruit. Other improvements are shown in U.S. Pat. No. 4,509,418 which issued to Stewart C. Nelson on Apr. 9, 1985 and in U.S. Pat. No. 4,774,880 which issued to Stewart C. Nelson on Oct. 4, 1988. These two latter patents both relate to improvements in the elastomeric support surface onto which the hemispherical pieces of fruit are delivered. Both U.S. Pat. Nos. 4,509,418 and 4,774,880 are assigned to the assignee of the subject invention. The disclosures of these various prior art patents are incorporated herein by reference.

Other prior art juicers are substantially more complex than those described and referenced above. In particular, some prior art juicers include complex assemblies of rotatable arms which grab hemispherical sections of fruit and move each section through a sweeping arc and toward an appropriate means for expressing juice from each hemispherical section of fruit.

Other prior art juicers operate without cutting the respective pieces of fruit into hemispherical sections. Prior art juicers of this general type are shown in: U.S. Pat. No. 3,736,865 which issued to Hait on June 5, 1973; U.S. Pat. No. 4,300,449 which issued to Segredo on Nov. 17, 1981; and U.S. Pat. No. 4,700,620 which issued to Cross on Apr. 20, 1987. These three references all show juicers having a vertical tube, the upper end of which terminates at a circular blade. A generally conical structure is mounted around the tube and includes upwardly extending supports for centering a fruit over the circular blade. These juicers further include a concave member having a second circular blade centrally disposed at the base of the concave member. The concave member is urged over the fruit to cut a generally cylindrical plug from the central portion of each fruit. The plug is urged longitudinally through the tube and is compressed by complex operative components within the tube and by other plugs of fruit that are subsequently urged into the tube. As shown most clearly in the above referenced U.S. Pat. No. 4,700,620, the rind or skin of the fruit is urged upwardly into a gap between the concave member and the circular knife of the apparatus. This is intended to separate the rind from the juice that is being prepared. The reference, however, is silent as to the method for disposing of the remaining skin or rind.

The prior art includes other juicers that are operative to express juice from an orange, grapefruit or the like without first severing the fruit in half. Examples of these prior art structures include: U.S. Pat. No. 2,345,731 which issued to Coyle on Apr. 4, 1944; U.S. Pat. No. 2,404,382 which issued to Klein on July 23, 1946; U.S. Pat. No. 2,677,324 which issued to Cadella on May 4, 1955; U.S. Pat. No. 2,705,452 which issued to Johnson on Apr. 5, 1955; U.S. Pat. No. 2,713,819 which issued to Lingle on July 26, 1955; U.S. Pat. No. 2,724,326 which issued to Long on Nov. 22, 1955; and, U.S. Pat. No. 2,742,852 which issued to McCulloch on Apr. 24, 1956.

In addition to increasing speed and maximizing juice yield, it is desirable to provide juicing machines that are easy to clean, simple to operate and easy to maintain. Many of the above described automated juicers that squeeze generally whole fruits are undesirably complex and therefore are difficult to operate, maintain and clean.

Another objective for most juicers is to avoid bitter-tasting juice. It is generally believed that the bitter taste associated with some fruit juices results from oils expressed from the skin of the fruit or from the seeds. Most of the above described juicers that are operative to squeeze juice from substantially whole fruits are likely to either crush the seeds or to significantly damage the skin, thereby releasing oils that contribute to a bitter tasting juice.

The above described juicing machines that squeeze substantially whole fruits have also generally provided inefficient means for disposing of the skins and other remains from the juicing process.

In view of the above, it is an object of the subject invention to provide a juicing machine that avoids the need to first sever the fruit into hemispherical sections.

It is another object of the subject invention to provide a juicing machine that minimizes the pressure exerted on central portions of the fruit in which the seeds are disposed.

An additional object of the subject invention is to provide a juicing apparatus that does not crush or otherwise severely damage the skin of the fruit.

Yet another object of the subject invention is to provide a juicing apparatus that efficiently disposes of the skin of the fruit.

A further object of the subject invention is to provide a juicing apparatus that is easy to maintain and clean.

SUMMARY OF THE INVENTION

The subject invention is directed to a juicing apparatus comprising a convex truncated cone having opposed ends of major and minor cross-sectional dimensions. The minor end is disposed gravitationally upwardly and defines a generally circular upwardly facing knife edge. The circular knife is operative to cut generally cylindrical plugs of fruit from the central portion of each fruit. The cylindrical plugs will include most of the seeds in the fruit.

A generally cylindrical plug tube extends downwardly from the circular blade and centrally through the convex cone. The plug tube may terminate at a reduced dimension bottom which may function as a restraint for downwardly moving plugs of the fruit being juiced. Portions of the plug tube may comprise apertures extending therethrough for permitting escape of at least some of the juice being expressed from the plugs. The lower end of the plug tube may be in communication with a discard tube which may define a greater cross-sectional dimension than the plug tube. As will be explained further below, the plugs of fruit urged into the plug tube may become compressed greater amounts as they approach the restriction in the plug tube. However, the compression of the plugs of fruit generally will not rupture the seeds in the fruit nor cause a flow of the bitter oils therefrom. The bitter oils associated with the seeds can further be prevented from mixing with the juice by having the lower portion of the plug tube substantially free of perforations, as explained herein.

The convex cone surrounding the plug tube may comprise an array of concentric outwardly directed ribs disposed on the outer surface thereof. The ribs help to squeeze the juice from the flesh of the fruit urged against the convex cone. The convex cone may further be provided with an array of perforations extending therethrough to facilitate the flow of juice from the fruit. Thus, the fruit juice may flow directly through the cone as well as flowing along an outer surface thereof.

The juicing apparatus further comprises a collector tray disposed generally below the convex cone and substantially surrounding the discard tube. The tray will collect juice squeezed in the plug tube plus the juice passing through or along the outer surface of the convex cone.

The juicing apparatus of the subject invention further comprises means for delivering fruit to the circular blade defined on the upper end of the convex cone. The delivery means may comprise a reservoir of fruit disposed at a convenient elevation which may be gravitationally below the convex cone. The delivery means may further comprise an elevator means for raising the fruit from the reservoir and delivering the fruit to the vicinity of the circular blade at the top of the convex cone. The provision of the reservoir of fruit below the convex cone may facilitate the handling of fairly heavy loads of fruit by store or restaurant personnel who may be operating the subject juicing apparatus. In particular, the relatively low position of the fruit reservoir avoids the need to lift large quantities of fruit to a elevated position for subsequent gravitational feeding of the fruit.

The juicing apparatus may further comprise centering means for centering the fruit onto the circular blade at the upper end of the convex cone. The centering means may comprise a plurality of supports aligned in generally radially directions relative to the circular blade. The supports may be mounted to a generally annular collar disposed about the convex cone. The supports may be pivotably mounted and may be biased into a position for concentrically supporting fruit of different respective sizes relative to the circular blade. In a preferred embodiment, as explained further below, four pivotable centering supports are mounted to a generally annular support collar and extend inwardly therefrom. The pivotable supports are biased by spring means into an upward position for supporting and centering the fruit on the circular blade of the juicing apparatus.

The juicing apparatus of the subject invention further comprises an array of generally radially aligned blades for cutting the fruit into sections. The blades may be rigidly mounted to a generally annular collar extending about the convex cone. Alternatively, the blades may be mounted to the cone. The object of the blades is to neatly cut the flesh and the skin of the fruit to ensure an efficient division of the fruit, and therefore an efficient wiping of the fruit against the outer ribbed surface of the convex cone. The precise slicing of the skin further minimizes the amount of bitter oils from the skin that may otherwise have been expressed from the skin. The efficient and precise cutting enabled by the blade further helps to prevent a folding over of the skin that might otherwise minimize the proportion of the desirable juices expressed from the fruit. In a preferred embodiment, the blades are disposed in alternate relationship to the centering supports at equally spaced distances around the circumference of the cone.

The juicing apparatus further comprises a press assembly which may include a concave cone that is selectively urgable over the convex cone. The concave cone may comprise a plurality of generally radially aligned slits which enable the concave cone to pass around the centering supports and/or the sectioning blades of the apparatus. The concave cone is operative to urge the fruit into the blades to effect the efficient cutting of the fruit into sections. Additionally, the concave cone is operative to urge each cut section of fruit against the convex cone. The wiping action achieved by this movement of the concave cone effectively expresses juice from the fruit.

A plunger may be disposed concentrically within the concave cone and may be dimensioned to pass concentrically within the generally cylindrical plug tube. The plunger may be operative to urge plugs of fruit downwardly and into the plug tube. The axial length of the plunger may be less than the overall axial length of the convex cone. Thus, the plugs of fruit adjacent the restriction in the plug tube may be sequentially urged through the restriction by adjacent plugs of fruit, and not by the direct action of the plunger.

The juicing apparatus may further comprise drive means for urging the concave cone and/or the convex cone toward one another to express juice from a fruit mounted on the circular blade. This drive means may comprise an electric motor having cam means mounted thereto for suitably urging at least the concave cone through reciprocal movement.

The juicing apparatus may further comprise means for ejecting the remains of each fruit section at the completion of each cycle. In particular, the ejecting means may comprise fingers which define portions of the convex cone or which are operative to pass through the cone for urging the remains of the fruit to one or more discard locations. The ejection fingers may be cam operated as part of the apparatus for moving the concave and/or convex cones. The receptacle for receiving the remains of the fruit may comprise a plurality of tubes disposed to receive the remains of the fruit. The tubes may be generally radially aligned and may extend to a common easily removable trash receptacle.

The juicing apparatus may further comprise cleaning means to facilitate periodic cleaning of the operative parts of the apparatus. The cleaning means may comprise at least one nozzle for delivering sprays of water to the apparatus for enabling or facilitating periodic cleaning.

DETAILED DESCRIPTION OF THE PREFERRED EMBODIMENT

Figure 1:
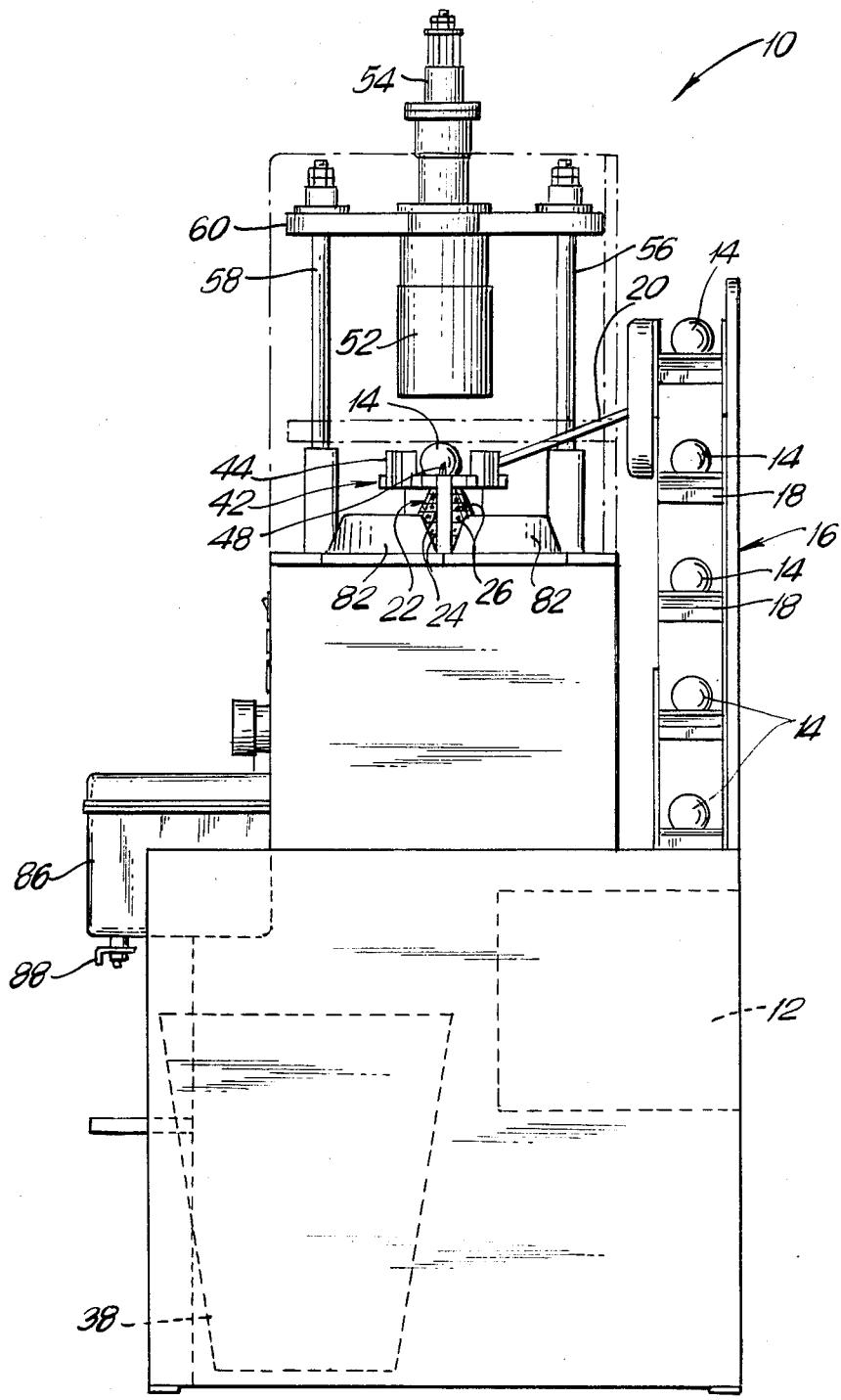
FIG. 1 is a side elevational view of the juicing apparatus of the subject invention.
Figure 2:
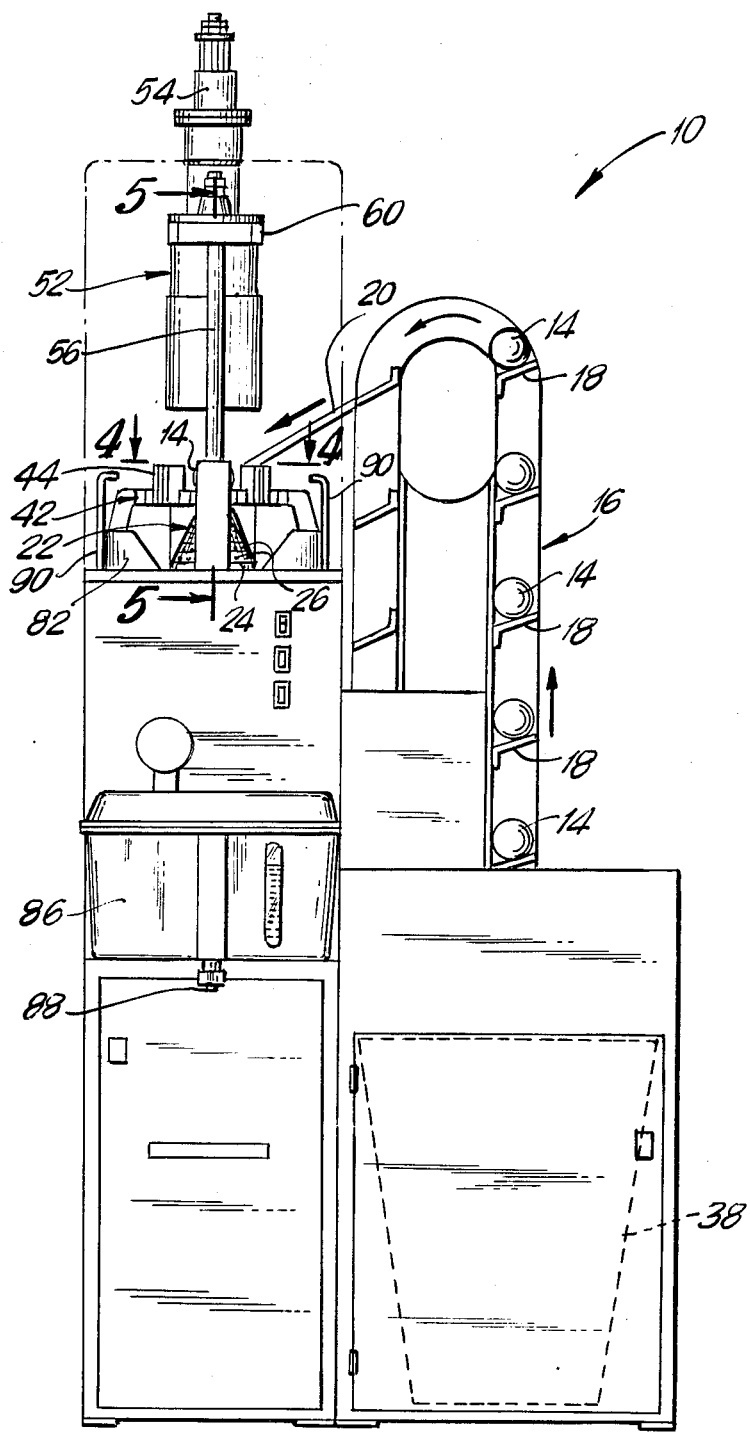
FIG. 2 is a front elevational view of the juicing apparatus.
Figure 3:
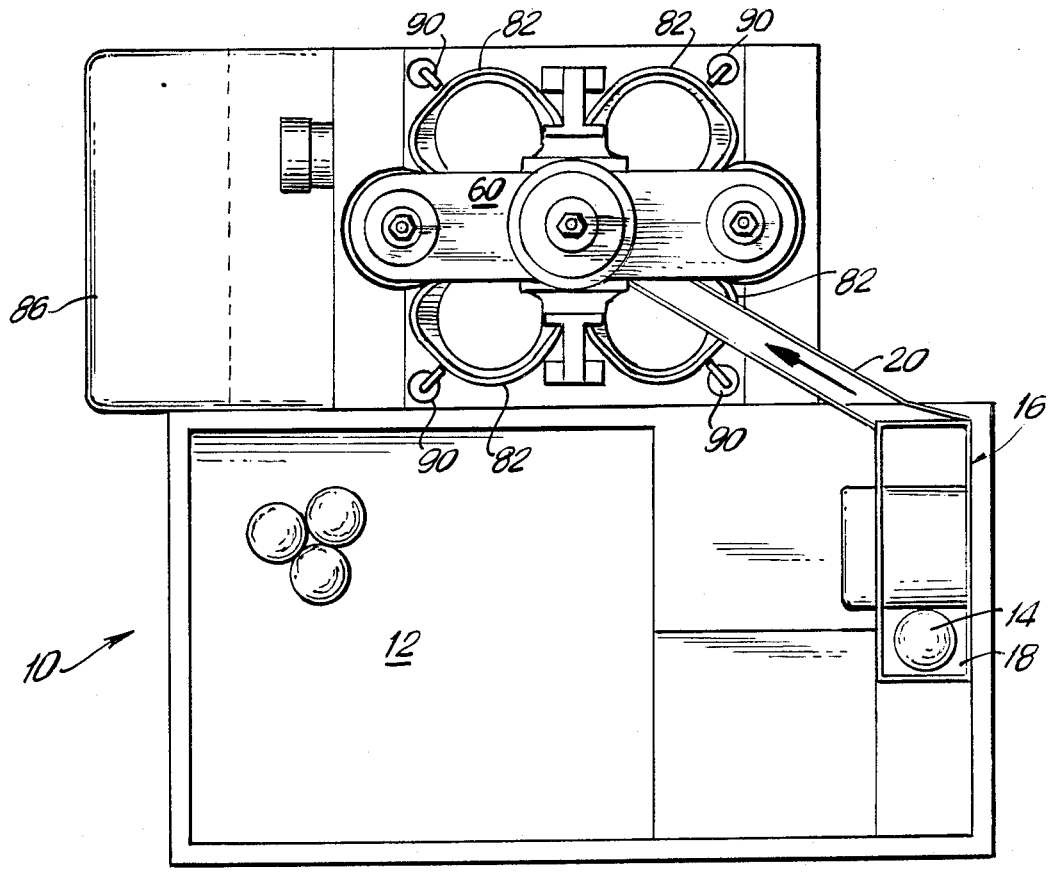
FIG. 3 is a top plan view of the subject juicing apparatus.

The juicing apparatus of the subject invention is identified generally by the numeral 10 in FIGS. 1-6. The juicing apparatus 10 comprises a reservoir 12, as shown in FIG. 1, for a supply of citrus fruits 14 such as oranges, grapefruits, lemons or limes. The fruit reservoir 12 preferably is disposed at a location at or slightly above ground level to facilitate the loading fruit from heavy containers into the reservoir 12. The juicing apparatus 10 further comprises a vertical conveyor 16 having platforms 18 for delivering individual fruits 14 to an elevated position on the apparatus 10. The spacing of the platforms 18 is selected to conform with the cycle time of the juicing apparatus 10. The vertical conveyor 16 is operative to sequentially deliver the fruits 14 to an inclined ramp 20 which delivers fruit to a location in the apparatus 10 where each fruit 14 is sequentially subject to the juicing operation as explained herein.

The juicing apparatus 10 comprises a convex truncated cone 22 having its axis of symmetry aligned substantially vertically with the major base being disposed at the bottom and a truncated minor base being disposed at the top. The cone 22 defines an angle "a" of approximately 20°-30° and preferably about 25° to achieve optimum juicing action. The convex cone 22 preferably is formed from a polished metal material, such as aluminum or stainless steel that is well suited to the acidic juices and other liquids used in the various juicing and cleaning processes. The external surface of the convex cone 22 is defined by an array of circular ribs 24 extending generally concentrically about the outer surface of the convex cone 22 in spaced relationship to one another. The convex cone 22 is further characterized by arrays of apertures 26 extending therethrough. The ribs 24 and apertures 26 cooperate to facilitate the expression of juice from each fruit 14 and the passage of at least a portion of the juice through the convex cone 22 and into a collector tray as explained further herein.

Figure 4:
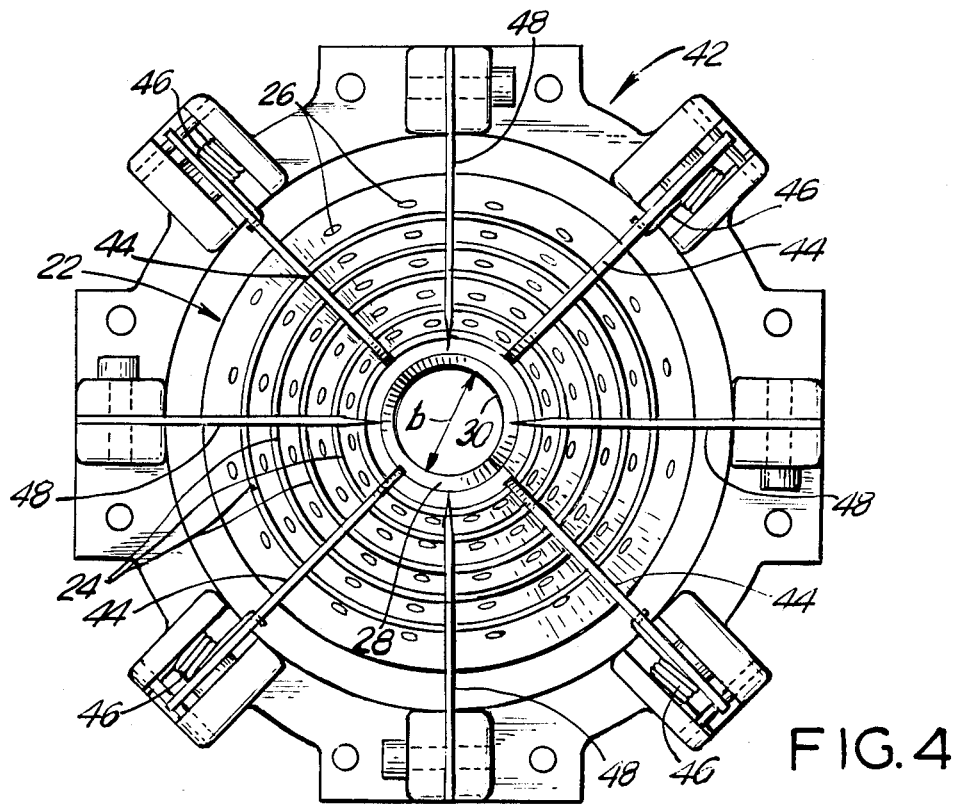
FIG. 4 is cross-sectional view taken along line 4—4 in FIG. 2.
Figure 5:
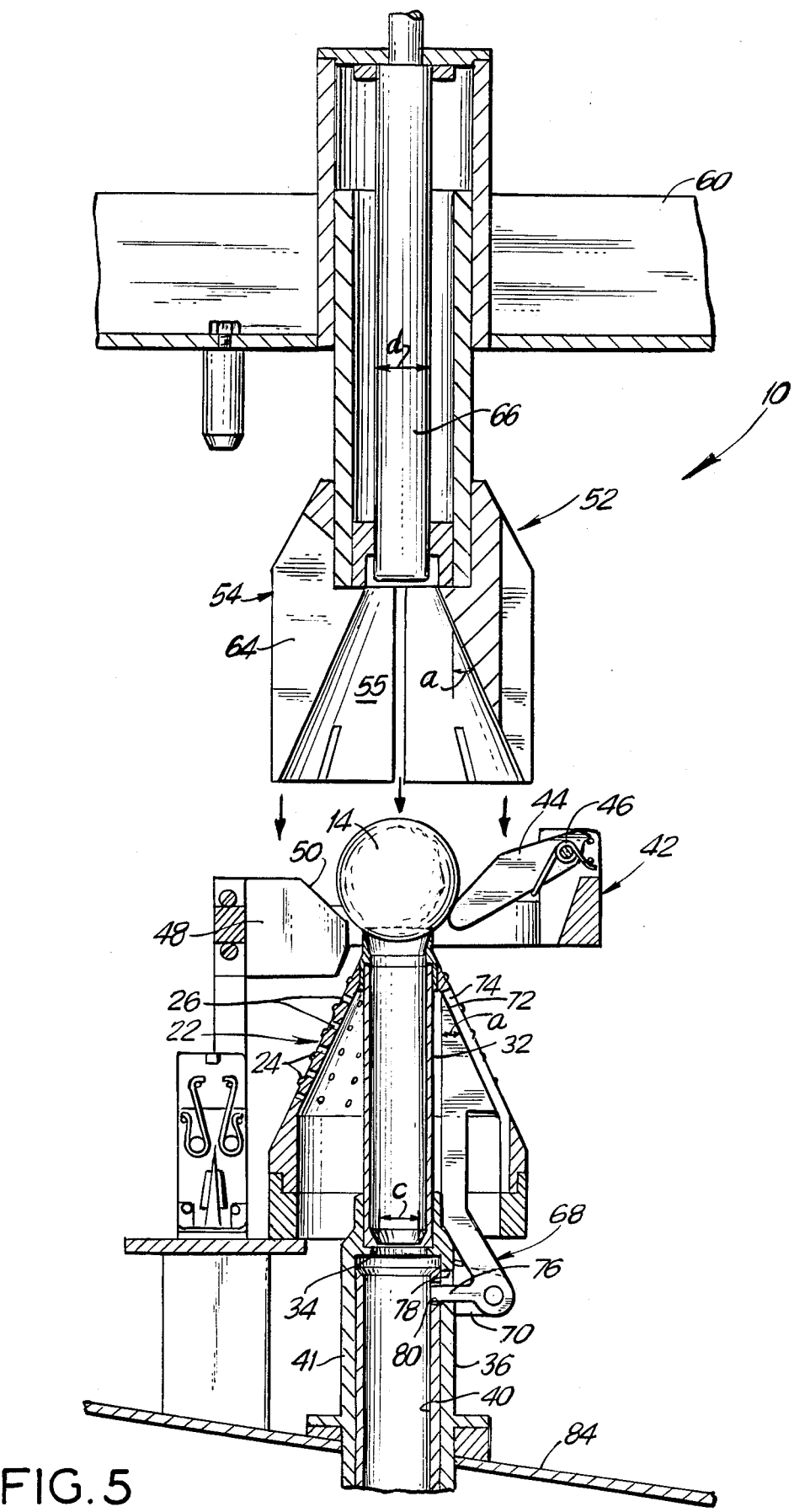
FIG. 5 is a cross-sectional view taken along line 5—5 in FIG. 2.

As shown most clearly in FIGS. 4 and 5, the top end of the convex cone 22 defines a circular knife edge 28 which surrounds and defines a cylindrical opening 30 of diameter "b" of approximately 1.5-2.0 inches. The circular blade 28 may be separately formed from the convex cone 22 and replaceably mounted thereon. The removability of the circular blade 28 enables replacement and/or sharpening as necessary. As will be explained further herein, the circular blade 28 is operative to cut a generally cylindrical plug from a central portion of each fruit 14.

As shown most clearly in FIG. 5, the juicing apparatus 10 further comprises a generally cylindrical perforated plug tube 32 disposed centrally within the cone 22 and extending downwardly from the circular blade 28. The cylindrical plug tube 32 defines an internal diameter substantially equal to the internal diameter "b" defined by the circular blade 28. However, the bottom end 34 of the plug tube 32 defines a restriction having a diameter "c" which is less than the diameter "b" elsewhere along the tube 32. As will be explained further below, the restriction created by the bottom 34 of the tube 32 contributes to some minor squeezing of the central cylindrical plugs 14a cut from each fruit 14. A discard tube 36 is disposed downwardly from the plug tube 32. The discard tube 36 extends to a receptacle 38 which is shown in FIG. 1 and which is positioned to receive the remains of each fruit 14 generated by a cycle of the apparatus 10 as explained herein. Returning to FIG. 5, the discard tube 36 includes cylindrical inner and outer sleeves 40 and 41 respectively which are operative to telescopingly move relative to one another. As will be explained further below, the relative movement of the sleeves 40 and 41 is operative to eject the sections of skin remaining from each fruit 14 after completion of a cycle of the juicing apparatus 10.

The apparatus 10 further comprises a support collar 42 disposed symmetrically about the convex cone 22 and generally in proximity to the circular knife 28 at the upper end of the convex cone 22. Additionally, the collar 42 is disposed generally in alignment with the lower end of the ramp 20 for delivering the fruit 14 to be juiced.

The collar 42 comprises an array of centering supports 44 extending radially inwardly from the collar 42 and toward the circular knife 28. The centering supports 44 are pivotably mounted to the collar 42 to rotate in generally radially aligned vertical planes toward and away from the circular knife 28. Spring means 46 are mounted to the collar 42 adjacent each centering support 44, and are operative to urge the centering supports 44 into an upward position for supporting each fruit 14 in a centered position above the circular knife 28. However, as will be explained further below, forces exerted on the fruit 14 during a juicing cycle will overcome the forces exerted by the springs 46 and permit the centering supports 44 to rotate downwardly and away from the circular knife 28 during each juicing cycle. It will be noted, with reference to FIG. 4, that four centering supports 44 are provided. However, any number greater than three centering supports 44 will be acceptable. Preferably, however, the centering supports 44 are spaced symmetrically from one another about the axis of the convex cone 22.

The collar 42 further comprises an array of radially aligned sectioning knife blades 48 which are rigidly mounted to the collar 42 and extend radially inwardly in vertical planes toward the circular blade 28. As shown in FIG. 4, the sectioning blades 48 are disposed intermediate adjacent centering supports 44. As shown more clearly in FIG. 5, each blade 48 includes a cutting edge 50 which extends generally toward a fruit 14 positioned on the circular blade 28. The cutting edges 50 of the respective blades 48 will be operative to cut the fruit 14 into sections for subsequent wiping and juicing action against the ribs 24 on the surface of the convex cone 22.

The juicing apparatus 10 further includes a press assembly 52 having a concave cone 54 which is disposed above the convex cone 22 and axially in line therewith. The concave cone 54 includes an interior surface 55, as shown most clearly in FIG. 5, which substantially conforms to the angle "a" of the convex cone. The press assembly 52 is operatively connected to appropriate power means for generating reciprocal movement along guide rods 56 and 58 alternately toward and away from the convex cone 22. More particularly, the concave cone 54 is mounted to a horizontal support 60 which extends between and is slidably mounted on the guide rods 56 and 58. In other embodiments of the subject juicer more than one concave cone 54 may be mounted to the horizontal support 60 in alignment with a corresponding number of convex cones 22 and collars 42 as described above.

The concave cone 54 includes an array of generally axially aligned slots 62 formed therein and generally corresponding in number and location to the blades 48. Thus, each blade 48 will be disposed within a corresponding slot 62 as the concave cone 54 moves downwardly toward and over the convex cone 22.

The press assembly 52 further comprises a plunger 66 which is disposed centrally within the convex cone 54 and is axially moveable relative to the concave cone 54. The plunger 66 defines a cross-sectional dimension "d" which is less than the internal diameter "b" of the tube 32 disposed within the convex cone 22. The plunger 66 is operative to urge plugs 14a of the fruit 14 downwardly through the tube 32 as explained below.

The juicing apparatus 10 further comprises a plurality of ejectors 68 which are pivotably mounted to supports 70 extending rigidly from the outer sleeve 41 of the discard tube 36. The ejectors 68 correspond in number to the number of centering supports 44 and are generally co-planar with the centering supports 44. Each ejector 68 comprises an ejector surface 72 which is aligned generally with the outer surface of the convex cone 22. In particular, the convex cone 22 comprises elongated slots 74 which lie generally in the same radial plane as the ejectors 68 and the centering supports 44. The slots 74 are dimensioned to permit portions of each ejector 68 adjacent the ejector surface 72 to pass therethrough.

Each ejector further comprises an actuating lever 76 extending from a portion thereof generally adjacent the pivotal mounting to the support 70. The actuating lever 76 extends through an aperture 78 in the outer sleeve 41 of the discard tube 36 and through an aperture 80 in the inner sleeve 40. The inner sleeve 40 is operatively connected to the drive motor (not shown) of the apparatus 10 to undergo a selected small movement as the press assembly 52 approaches the end of each respective cycle. In particular, the inner sleeve 40 will move slightly upwardly relative to the outer sleeve 41 of the discard tube 36 as the press assembly 52 approaches the end of its upward movement. The upward movement of the sleeve 40 will generate a rotation of the ejector 68 about its pivotable mounting to the support 70. The small movement in the relatively short actuating lever 76 will generate a comparatively great movement at the ejector surface 72 which is a substantially greater distance away from the pivot point. Thus, the ejector surface 72 will be urged outwardly and through the slot 74 in the convex cone 22. The outward movement of the ejector surface 72 will cause the remains 14b of the fruit 14 adjacent thereto to be ejected away from the surface of the convex cone 22. The apparatus 10 further comprises discard chutes 82 which are disposed in spaced relationship to the convex cone 22 and which are generally radially aligned with the centering supports 44. The chutes are dimensioned and disposed to receive the remains of the fruit 14 ejected by the ejectors 68. The discard chutes 82 extend to a lower location in proximity to the discard receptacle 38, for receiving the remains of the fruit 14.

The juicing apparatus 10 further comprises a collector tray 84 disposed generally below the convex cone 22 and in position to receive the juice expressed from the fruit 14. The collector tray 84 surrounds and closely engages the discard tube 36. The collector tray 84 further extends to a receptacle 86 having a nozzle 88 extending therefrom to permit containers to be filled with juice produced by the apparatus 10.

Nozzles 90 are disposed about the periphery of the convex cone 22 and are directed radially inwardly. The nozzles 90 are connectable to a supply of water and are operative to efficiently clean the apparatus 10.

Figure 6:
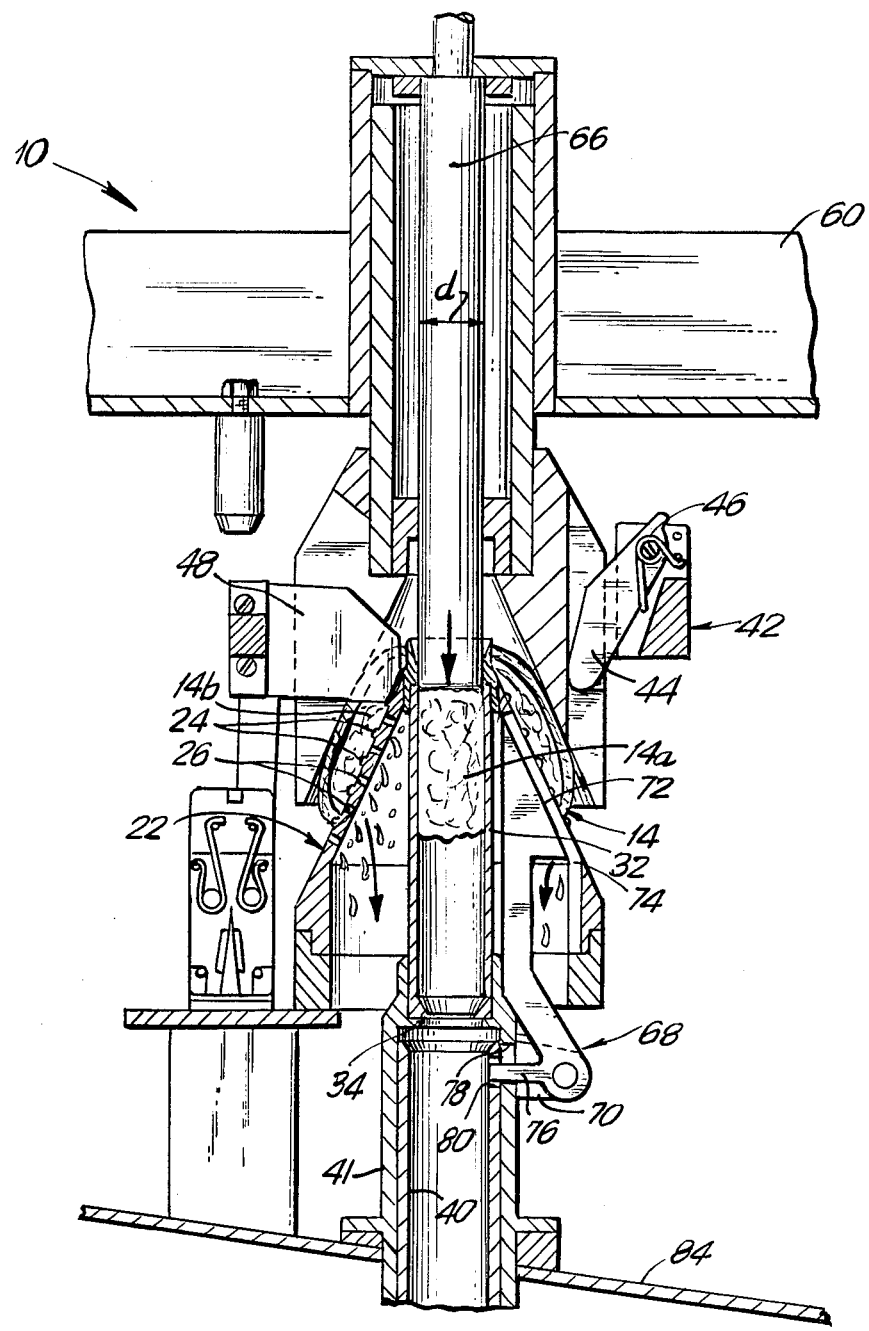
FIG. 6 is a cross-sectional view similar to FIG. 5 but showing the juicing apparatus in a second operational condition.
Figure 7:
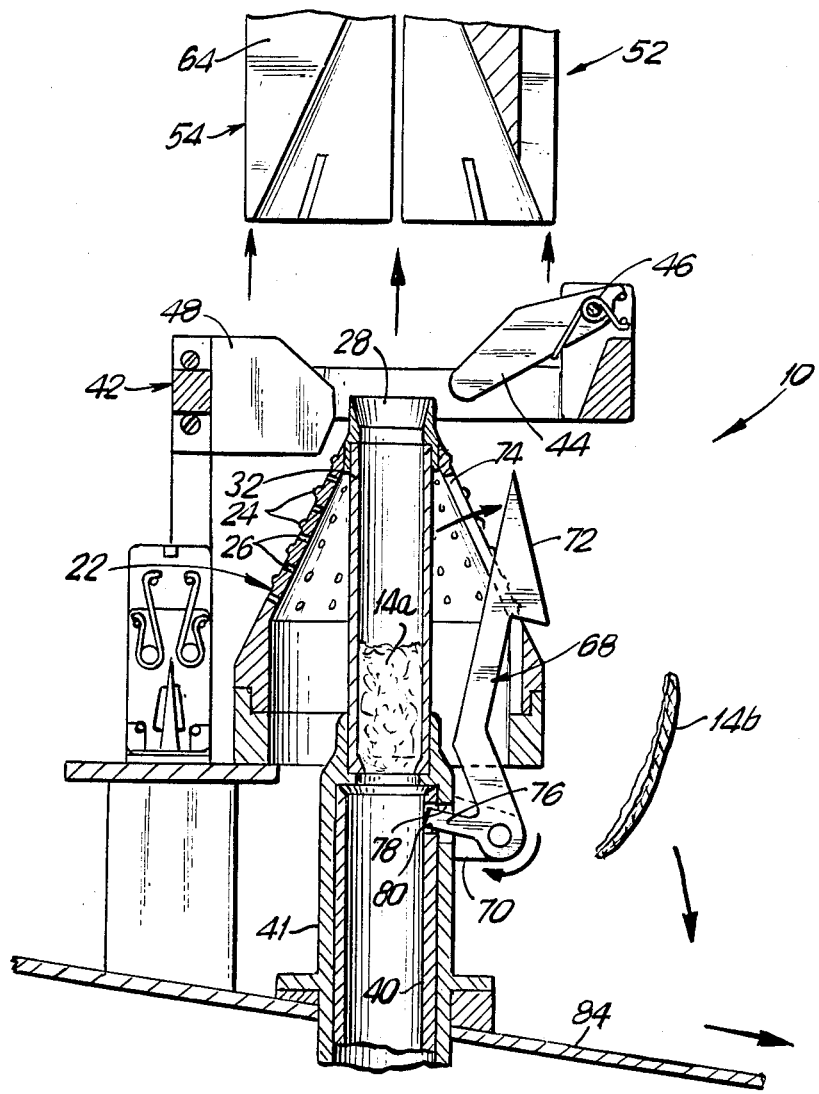
FIG. 7 is a cross-sectional view similar to FIGS. 5 and 6 but showing the juicing apparatus in a third operational condition.

The operation of the juicing apparatus 10 can be explained with reference to FIGS. 1 and 5–7. In particular, the vertical conveyor 16 is operative to lift fruit 14 sequentially to the ramp 20. The individual fruits 14 then are gravitationally fed down the ramp 20 and are centered on the circular knife 28 by the centering supports 44. This centering ensures that the central portion of each fruit 14, in which the bitter seeds are disposed, is aligned generally concentrically with the circular knife 28. The delivery of fruit 14 by the vertical conveyor 16 is timed to coincide with the cycling of the press assembly 52. More particularly, the motor of the apparatus 10 is operative to urge the horizonal support 60 downwardly along the vertical columns 56 and 58 such that the concave cone 54 is urged over the fruit 14 and toward the convex cone 22. The downward movement of the concave cone 54 will cause the centering supports 44 to be pivoted downwardly and into a position that enables continued downward movement of the concave cone 54. The downward movement of the concave cone 54 causes the plunger 66 thereof to urge the fruit 14 downwardly and into the circular knife 28 to cut a generally cylindrical plug 14a from the central portion of the fruit 14, as shown in FIG. 6. The cylindrical plug 14a is urged into the plug tube 32 by the plunger 66. The downward movement of the concave cone 54 further urges portions of the fruit 14 into the cutting edges 50 of the blades 48 to slice the fruit 14 into sections as shown in FIG. 6. Further downward movement of the concave cone 54 will generate a wiping action between the sections 14b of the fruit 14 against the ribs 24 on the outer surface of the convex cone 22. This wiping and squeezing action generated by the downward movement of the concave cone 54 over the convex cone 22 will express the juice from the sections 14b of fruit 14. As depicted schematically in FIG. 6, a substantial portion of the expressed juice will be urged through the apertures 26 in the convex cone 54. Remaining portions of the juice will run over exterior portions of the convex cone 22.

The concave cone 54 will stop its downward movement prior to actual face-to-face nesting with the convex cone 22. However, the plunger 66 will continue a downward movement to urge the plug 14a of the fruit 14 downwardly through the plug tube 32 and toward the lower end restriction 34 thereof. The movement of the plunger 66 will not urge the plug 14a entirely through the restriction at the lower end 34 of the plug tube 32. Rather, the plug of the next sequential fruit 14 to be juiced will contact the previously positioned plug 14a and urge this previously positioned plug 14a through the restriction at the lower end 34 of the plug tube 32. The forces exerted on the upper fruit plug and the plunger 66 and the lower fruit plug 14a will cause some squeezing of the upper fruit plug, with the juices generated thereby being urged outwardly through apertures in the upper portion of the plug tube 32. However, the amount of squeezing will generally not be sufficient to rupture the seeds in the central plug 14a with a corresponding release of the bitter oils therein. Rather, the lower fruit plug 14a will be urged through the lower end restriction 34 without a significant build-up of compressive forces therein.

The press assembly 52 begins an upward movement after completing the full range of motion in the downward direction. As the press 52 approaches its maximum range of upper movement, a small upward movement will be generated in the sleeve 40. This movement of sleeve 40 will cause the actuating lever 76 of each ejector 68 to be rotated about the pivot point with a corresponding outward movement of the ejector surface 72. As shown most clearly in FIG. 7, this outward movement of the ejector surface 72 will cause a rapid ejection of the remains of the fruit 14 toward the discard chute 82 as explained above.

While the invention has been described with respect to a preferred embodiment, it is apparent that various changes can be made without departing from the scope of the invention as defined by the appended claims.

I claim:

1. A juicing apparatus for expressing juice from citrus fruits, said apparatus comprising:
   a convex truncated cone having a major diameter bottom and a minor diameter top, said top defining a generally annular knife, a plug tube extending downwardly through the convex cone from the circular knife thereof;
   centering means for supporting a fruit on the circular knife;
   a plurality of spaced apart sectioning knives disposed in proximity to the circular knife and generally radially aligned thereto;
   a press means for urging the fruit downwardly toward the convex cone such that a generally cylindrical central plug is cut from the fruit and such that portions of the fruit disposed outwardly from the cylindrical plug are cut into sections by the sectioning knives, said press means being operative to urge the sections of fruit against the convex cone to express juice therefrom;
   means for collecting the expressed juice; and
   means for ejecting the sections of fruit away from the cone after the juice has been expressed therefrom.

2. A juicing apparatus as in claim 1 wherein the press means comprises a concave cone configured and dimensioned for movement over the convex cone such that the cut sections of fruit are urged therebetween.

3. A juicing apparatus as in claim 2 wherein the press means further comprises a plunger movable relative to the concave cone for urging the cylindrical plugs of fruit through the plug tube disposed in the cone.

4. A juicing apparatus as in claim 1 wherein the conically configured walls of the cone define an angle of between 20 degrees and 30 degrees relative to the axis of the truncated convex cone.

5. A juicing apparatus as in claim 1 wherein the convex cone further comprises an array of generally circular ribs on an outer surface thereof, said ribs being generally concentric with the cone.

6. A juicing apparatus as in claim 5 wherein the cone further comprises an array of apertures extending therethrough for receiving the juice expressed from the fruit.

7. A juicing apparatus as in claim 1 wherein the centering mean comprise a plurality of generally radially aligned deflectable centering supports pivotably mounted in proximity to the circular knife and having biasing means for urging the centering supports into a position for supporting the fruit on the circular knife.

8. A juicing apparatus as in claim 7 further comprising a generally annular collar rigidly mounted to said juicing apparatus and extending generally concentrically around the circular knife thereof, said deflectable centering supports being pivotably mounted to said collar.

9. A juicing apparatus as in claim 8 wherein the sectioning blades are rigidly mounted to said collar and are aligned in generally radially extending planes at spaced apart location about said collar.

10. A juicing apparatus as in claim 1 wherein the convex cone comprises a plurality of generally radially aligned slots therein and wherein the ejection means comprises ejector levers aligned respectively with the radial slots in the cone, said levers being pivotable relative to said cone for urging the respective sections of fruit away from the cone after the juice has been expressed therefrom.

11. A juicing apparatus as in claim 10 further comprising motor means for driving the press means selectively toward and away from the convex cone, said motor means being operatively connected to said ejector levers for ejecting the sections of fruit at a selected point in the movement of the press assembly away from the convex cone.

12. A juicing apparatus as in claim 11 further comprising a plurality of discard chutes aligned with and spaced from the convex cone for receiving the sections of fruit ejected therefrom.

13. A juicing apparatus as in claim 1 further comprising delivery means for sequentially delivering fruit to the circular knife.

14. A juicing apparatus as in claim 13 wherein the delivery means comprises an inclined ramp aligned with the circular knife and a vertically aligned conveyor for lifting fruit sequentially to a selected location on the ramp.

15. A juicing apparatus for expressing juice from citrus fruits, said juicing apparatus comprising:
   a fruit reservoir for storing a supply of citrus fruits;
   a truncated convex cone disposed in spaced relationship to the reservoir, said convex cone having a major diameter bottom and a minor diameter top defining a circular knife, a plug tube extending generally concentrically through the convex cone and generally aligned with the circular knife;

means for sequentially delivering the fruit from the reservoir to the circular knife;

a plurality of generally radially aligned centering supports in proximity to the circular knife for centering each delivered fruit on the circular knife;

a plurality of generally radially aligned sectioning knives aligned in proximity to the circular knife;

a press assembly movably disposed in proximity to the convex cone for urging the fruit over the circular knife and over the convex cone;

drive means for reciprocally driving the press assembly toward and away from the convex cone; and ejector means operatively connected to the drive means for ejecting the sections of fruit away from the cone after the expression of the juice therefrom.

16. A juicing apparatus as in claim 15 wherein the convex cone comprises a plurality of generally radially aligned slits disposed generally in alignment with the centering supports of said apparatus, the ejector means comprising ejector levers mounted for pivotable movement through the slits in the cone, said ejector levers being disposed to selectively eject the sections of fruit away from the cone.

17. A juicing apparatus as in claim 15 further comprising an annular collar rigidly supported in concentric relationship to the convex cone, said centering supports being pivotably mounted to said collar and being biased into positions for centering a fruit on the circular knife, said centering knives being rigidly mounted to the annular collar and disposed respectively between adjacent centering supports.

* * * * *